I. H. CONKLIN.
Harvester.

No. 17,025.

Patented April 14, 1857.

UNITED STATES PATENT OFFICE.

ISAAC H. CONKLIN, OF ROCKFORD, ILLINOIS.

IMPROVEMENT IN RAKING ATTACHMENTS FOR HARVESTERS.

Specification forming part of Letters Patent No. 17,025, dated April 14, 1857.

*To all whom it may concern:*

Be it known that I, ISAAC H. CONKLIN, of Rockford, in the county of Winnebago and State of Illinois, have invented a new and useful Improvement in Raking Attachments for Harvesters; and I do hereby declare that the following is a full, clear, and exact description of the same, reference being had to the annexed drawings, making a part of this specification, in which—

Figure 1:
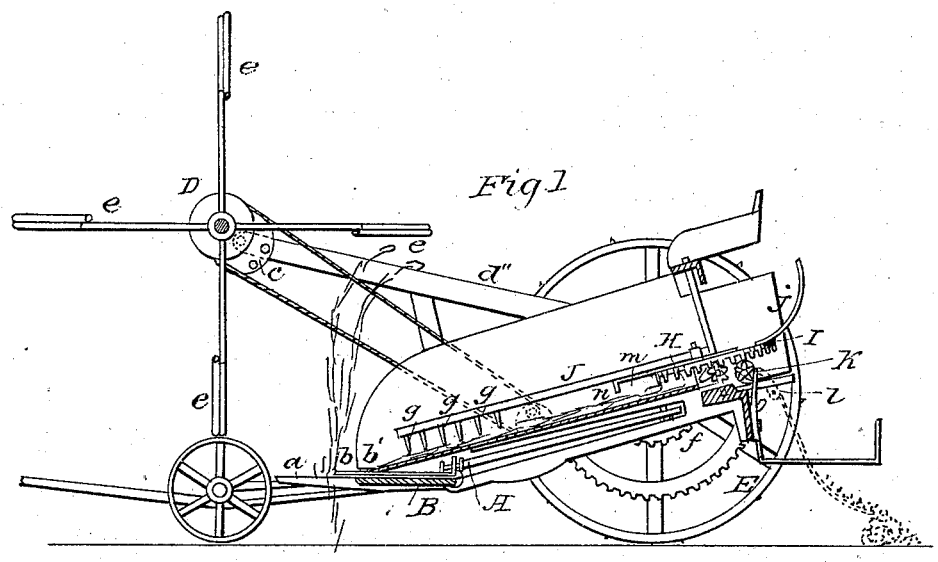
Figure 2:
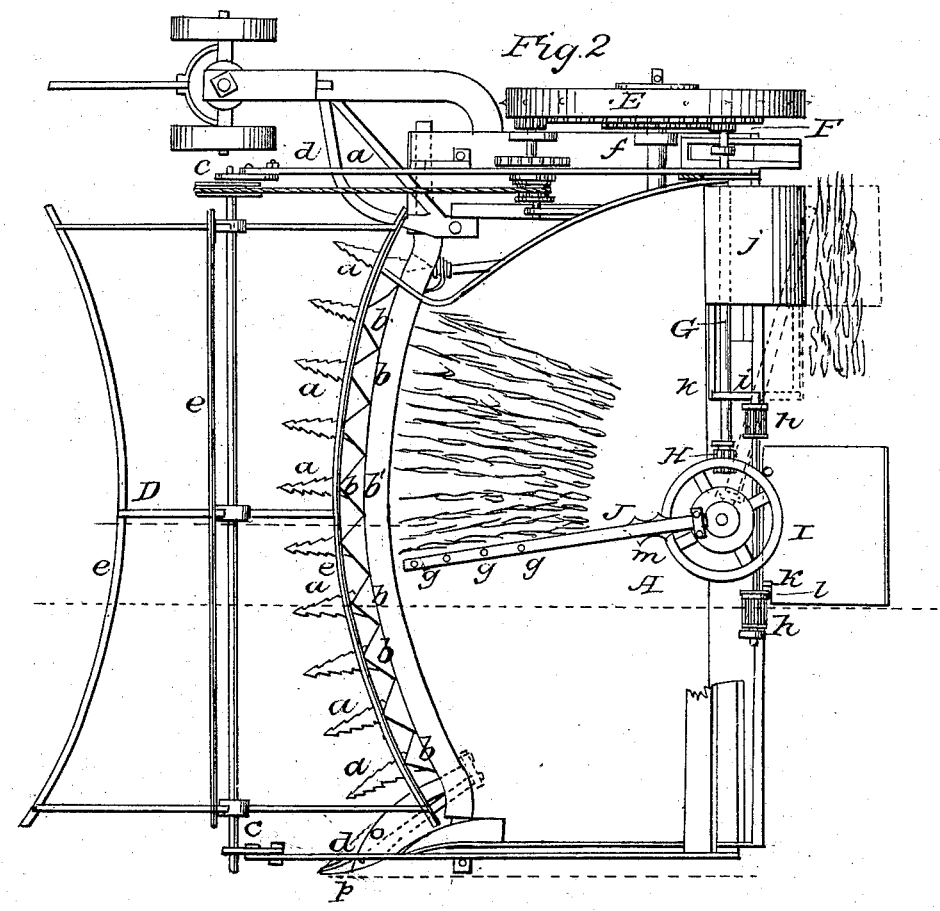

Figure 1 is a transverse vertical section of a harvester with my improvement applied to it, $x\ x$, Fig. 2, showing the plane of section. Fig. 2 is a plan or top view of the same.

Similar letters of reference indicate corresponding parts in both figures.

This invention relates to a novel means employed for discharging the sheaves or gavels.

To enable those skilled in the art to fully understand and construct my invention, I will proceed to describe it.

A represents the platform of the harvester, and B is the finger-bar, which is attached to the framing and placed at the front end of the platform. The finger-bar is of curved form, and is a segment or part of a circle. The fingers $a$ are attached to the bar B radially, as clearly shown in Fig. 2.

C is the sickle, which is provided with teeth $b$, of the usual saw-tooth or triangular form. The sickle is bent or curved corresponding to the finger-bar, and is secured upon it in the usual way. The sickle-bar is covered by a plate, $b'$, which extends its whole length.

D represents the reel, the journals of the shaft of which are fitted in circular disks $c$, attached or pivoted to the ends of bars $d'$, attached to the framing of the machine. The disks $c$ have holes made through them near their edges, to receive the journals of the shaft, and by turning the disk $c$ the reel may be raised or lowered, as desired.

The reel is of the usual construction, with the exception of the beaters or rods $e$, which are attached to the arms of the reel. These beaters or rods, instead of being parallel with the shaft of the reel, as usual, are made of curved form, corresponding or approximating to the curvature of the finger-bar, as shown clearly in Fig. 2. The reel may be driven in any proper manner from the driving-wheel E, and the sickle C is also driven from the wheel E by any proper means.

To the inner side of the driving-wheel E a toothed wheel, $f$, is attached, concentric with the wheel E, and F is a pinion which gears into the wheel $f$. The pinion F is placed on a shaft, G, which is at the back part of the platform A. The inner end of this shaft has a pinion, H, upon it, which pinion gears into a wheel, I, placed at the back end of the platform, at about its center or in line with its center. The wheel I has a rod, J, attached radially to it, said rod having rake-teeth $g$ at its outer end. This outer end of the rod J extends nearly out to the front end of the platform A.

K is a shaft, also placed at the back part of the platform A. This shaft has two pinions or wheels, $h\ h$, upon it, one wheel at its inner end and the other at a point about an equal distance at the opposite side of the wheel I, as shown clearly in Fig. 2. The shaft K has a bend, $i$, in it, forming a sort of crank-connection between its outer and inner end, and the outer end of the shaft has a hopper or curved plate, $j$, attached, the outer end of said plate being curved upward. The shaft K has a cam, $k$, upon it adjoining the inner pinion, $h$, and a spring, $l$, bears against this cam, the said spring retaining the shaft and hopper in proper position. To the wheel I a radial plate, $m$, is attached. The rod J is connected to this plate in any proper manner, and a pin, $n$, is attached to the under side of the plate $m$.

To the outer end of the finger-bar B a plate, $o$, is attached, and to this plate a bar, $p$, is pivoted. The inner end of this bar is connected by a link to the end of the sickle, as shown by dotted lines, and the outer end of the bar projects beyond the outer end of the plate $o$, as shown in Fig. 2.

The operation is as follows: As the machine is drawn along the sickle, owing to its curved form, will make a corresponding curved cut in the grain, and the bars $e$ of the reel D, being also curved, will act simultaneously on or against the grain the whole length of the cut, and, owing to the curved form of the sickle and bars $e$ of the reel, the cut grain will be thrown in a radial position on the platform A, as shown in red, Fig. 2. A rotating motion is given the rod J in consequence of the wheel $f$ gearing with the pinion F on the shaft G and the pinion H on said shaft gearing into the wheel I. As the rake-teeth $g$ sweep over the platform the cut grain is raked into the hopper $j$, and at this point the pin *n* passes over and turns the outer pinion *h* on the shaft K, and the hopper is tilted or thrown down, as shown in red, Fig. 1, the grain that was raked into it falling in a gavel or sheaf upon the ground. As the rod J rotates the pin *n* strikes the inner pinion *h* and throws up the hopper *j* to its original position.

A vibratory movement is given the bar *p* by the sickle, and the outer end of the bar serves to gather the standing grain at the outer end of the platform toward the sickle, so as to leave a clean and perfect cut, preventing stalks from being bent over by the rubbing of the end of the platform against them, and by other causes. It will be seen that the effect of the bar *p* is to gather the grain at the outer end of the sickle and a short distance beyond its reach within the path of the sickle, so that a swath a trifle wider than the width of the sickle may be cut and the machine allowed to pass along; so that the outer end of the platform cannot come in contact with the standing grain. The cut grain being thrown radially on the platform, as described, the rake is enabled to throw it into the hopper without shelling or loosening the grain from the heads. The cut grain is acted upon in an easy manner, the teeth *g* being in contact only with the butts of the stalks.

Having thus described my invention, what I claim as new, and desire to secure by Letters Patent, is—

Operating the hopper *j*, attached to the shaft K by means of the pin *n* on the plate *m*, in combination with the pinions *h h* on the shaft K, when the said parts are constructed and arranged in relation to the platform A in the manner and for the purpose set forth.

ISAAC H. CONKLIN.

Witnesses:
JAMES WALSHE,
R. F. CHURCH.